United States Patent [19]

Kimura et al.

[11] Patent Number: 5,113,456
[45] Date of Patent: May 12, 1992

[54] METHOD OF AND APPARATUS FOR RECORDING IMAGE

[75] Inventors: Hideaki Kimura; Osamu Shimazaki, both of Kanagawa, Japan

[73] Assignee: Fuji Photo Film Co., Ltd., Kanagawa, Japan

[21] Appl. No.: 318,406

[22] Filed: Mar. 3, 1989

[30] Foreign Application Priority Data

Mar. 4, 1988 [JP] Japan .................. 63-52452

[51] Int. Cl.[5] ............................................. G06K 9/40
[52] U.S. Cl. ........................................ 382/54; 382/41; 382/27; 358/137; 358/138
[58] Field of Search ............... 382/54, 8, 1, 22, 34, 382/27, 62, 41, 50; 358/452, 459, 461, 166, 167, 447, 448, 463, 137, 138

[56] References Cited

U.S. PATENT DOCUMENTS

| 4,625,330 | 11/1986 | Higgins | 382/54 |
| 4,724,544 | 2/1988 | Matsumoto | 382/54 |
| 4,888,492 | 12/1989 | Arimoto | 382/54 |
| 4,912,565 | 3/1990 | Yokota et al. | 382/54 |
| 4,912,567 | 3/1990 | Nakajima et al. | 382/54 |
| 4,995,093 | 2/1991 | Funahashi et al. | 382/54 |

Primary Examiner—Michael Razavi
Attorney, Agent, or Firm—Sughrue, Mion, Zinn, Macpeak & Seas

[57] ABSTRACT

An image of an original is recorded on a recording medium such as a film based on image signals produced from the original by scanning the original at a predetermined sampling pitch in a main scanning direction and also scanning the original in an auxiliary scanning direction transverse to said main scanning direction. Image information is read from the original at a sampling pitch which is N times (N is a positive integer) larger than the predetermined pitch in the main scanning direction, and image information is read from the original on at least every Nth scanning line across the auxiliary scanning direction, to produce image signals. The image signals are then processed in an image processing mode for sharpness emphasis, for example. The processed image signals are extracted repeatedly N times and recorded on the recording medium in a main scanning direction thereof. Processed image signals on N scanning lines are also extracted which include at least the processed image signals corresponding to an Nth scanning line, and recorded on the recording medium in an auxiliary scanning direction thereof.

4 Claims, 3 Drawing Sheets

METHOD OF AND APPARATUS FOR RECORDING IMAGE

BACKGROUND OF THE INVENTION

The present invention relates &o a method of and an apparatus for recording an image, and more particularly to a method of and an apparatus for recording an image while effectively processing image signals for increased sharpness or the like in an image scanning recording system such as a scanner for making a printing plate, a facsimile transmitter/receiver, or the like.

Image scanning recording systems are widely used in the printing and platemaking industries for electrically processing image information of originals or subjects to produce original film plates with a view to simplifying the entire process and improving the quality of printed images.

The image scanning reproducing systems are basically constructed of an image reading apparatus and an image recording apparatus. In the image reading apparatus, image information of an original or subject which is fed in an auxiliary scanning direction is scanned in a main scanning direction substantially normal to the auxiliary scanning direction, and the scanned image information is converted to an electric signal. Then, the photoelectrically converted image information is processed in the image recording apparatus for signal processing according to platemaking conditions. Thereafter, the processed image signal is converted back to a light signal which is applied to and recorded on an image recording medium such as a photographic film. The image recording medium with the image recorded thereon is developed by an image developing device and will be used as a film plate for printing.

Where an original image is a continuous-gradation image such as a photographic image, the image signal produced from the image is subjected to a sharpness enhancing process for sharpening the edge or contour of the image. The sharpness enhancing process is effected as shown in FIG. 1 of the accompanying drawings, for example. First, an image signal S is picked up from a desired pixel in an original image, and (n × n) image signals are picked up from corresponding pixels disposed around the pixel from which the image signal S has been produced. Then, the (n × n) image signals are added and averaged to generate an unsharp signal U. The difference signal between the image signal S and the unsharp signal U is calculated, and then multiplied by a prescribed coefficient (sharpness parameter) K. The product is added to the image signal S. As a result, an image signal S* which is subjected to the sharpness enhancing process is given according to the following equation:

$$S^* = S + K \cdot (S - U) \quad (1)$$

After a continuous-gradation image such as a photographic image has been enhanced in sharpness, the image is converted to a halftone dot image. More specifically, the image signals are converted to on-off signals based on a predetermined halftone dot signal, and a halftone dot image composed of halftone dots of desired sizes is formed on a recording medium based on the on-off signals.

When the size of halftone dots used in the halftone dot image forming process is increased, e.g., coarse half-tone dots (the number of halftone lines: 64 to 85 lines/inch) are used for newspaper printing or the like, the size of an image mask which is composed of the (n × n) pixels selected to produce the unsharp signal U in the sharpness enhancing process becomes small relatively to the above halftone dot size. In this case, the degree to which the image edge is sharpened by the sharpness enhancing process becomes smaller, i.e., the desired sharpness of the image cannot sufficiently be achieved.

Therefore, for increasing the size of halftone dots, it is necessary to increase in advance the number of pixels used to produce an unsharp signal U for effecting a sharpness enhancing process. If the number of such pixels is increased, however, the storage capacity of a memory required for temporarily storing image signals which will be used in the sharpness enhancing process must also be increased.

SUMMARY OF THE INVENTION

It is a principal object of the present invention to provide a method of and an apparatus for recording an image while effectively processing image signals for increased sharpness without increasing the storage capacity of a memory required to store the image signals, by selecting a sampling pitch for reading image information from an original image to be larger than a predetermined value.

Another object of the present invention is to provide a method of recording an image on a recording medium based on image signals produced from an original by scanning the original at a predetermined sampling pitch in a main scanning direction and also scanning the original in an auxiliary scanning direction transverse to said main scanning direction, said method comprising the steps of: reading image information from said original at a sampling pitch which is N times (N is a positive integer) larger than said predetermined pitch in said main scanning direction, and reading image information from said original on at least every Nth scanning line across said auxiliary scanning direction, to produce image signals; processing said image signals in an image processing mode for enhancing image sharpness; extracting the processed image signals repeatedly N times to record the same on the recording medium in a main scanning direction thereof; and extracting the processed image signals on N scanning lines including at least the processed image signals corresponding to an Nth scanning line to record the image signals on the recording medium in an auxiliary scanning direction thereof.

Still another object of the present invention is to provide a method of recording an image on an original, wherein the processed image signals corresponding to said Nth scanning line are extracted repeatedly N times to record the image signals on the recording medium in the auxiliary scanning line.

Yet another object of the present invention is to provide a method of recording an image on an original, wherein the processed image signals corresponding to successive scanning lines are extracted successively to record the image signals on the recording medium along N scanning lines across the auxiliary scanning line.

A further object of the present invention is to provide an apparatus for recording an image on a recording medium based on image signals produced from an original by scanning the original at a predetermined sampling pitch in a main scanning direction and also scanning the original in an auxiliary scanning direction transverse to said main scanning direction, said apparatus comprising: sampling signal setting means for setting a sampling signal in the main scanning direction; signal converting means for converting image information produced by scanning the original to image signals based on said sampling signal; plurality of memory means for storing said image signals with respect to respective scanning lines; switch means for successively switching said memory means with respect to the scanning lines and connecting the memory means successively to said signal converting means; switching signal setting means for setting a switching signal to be applied to said switch means; said signal converting means including means for producing the image signals based on the sampling signal which has a sampling pitch N times (N is a positive integer) said predetermined sampling pitch and also on the switch signal produced by said switch signal setting means with respect to each of N scanning lines; and image signal processing means for processing the image signals from said memory means in an image processing mode for enhancing image sharpness.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
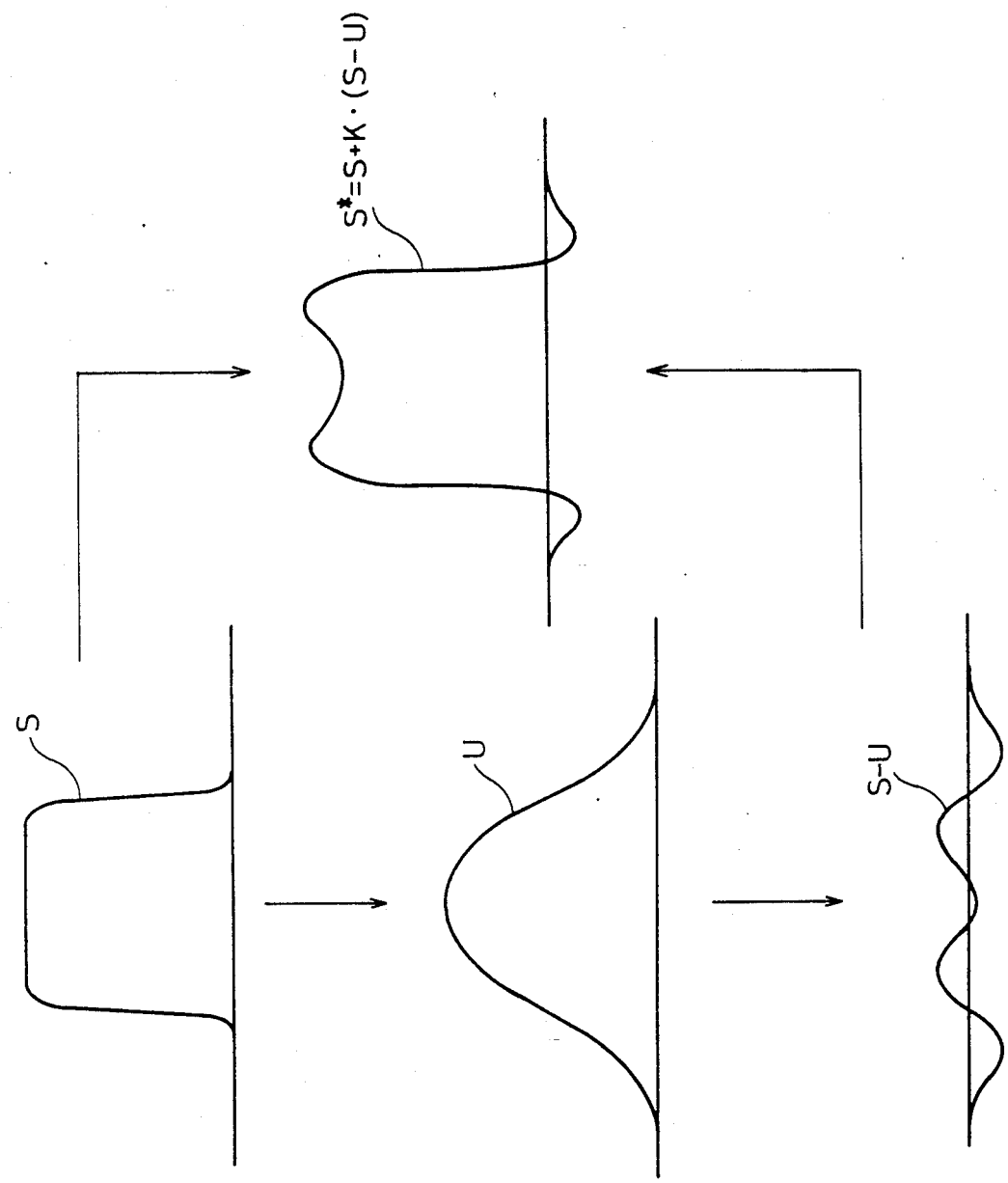
FIG. 1 is a diagram illustrating a sharpness emphasizing process to be effected on an image signal.
Figure 2:
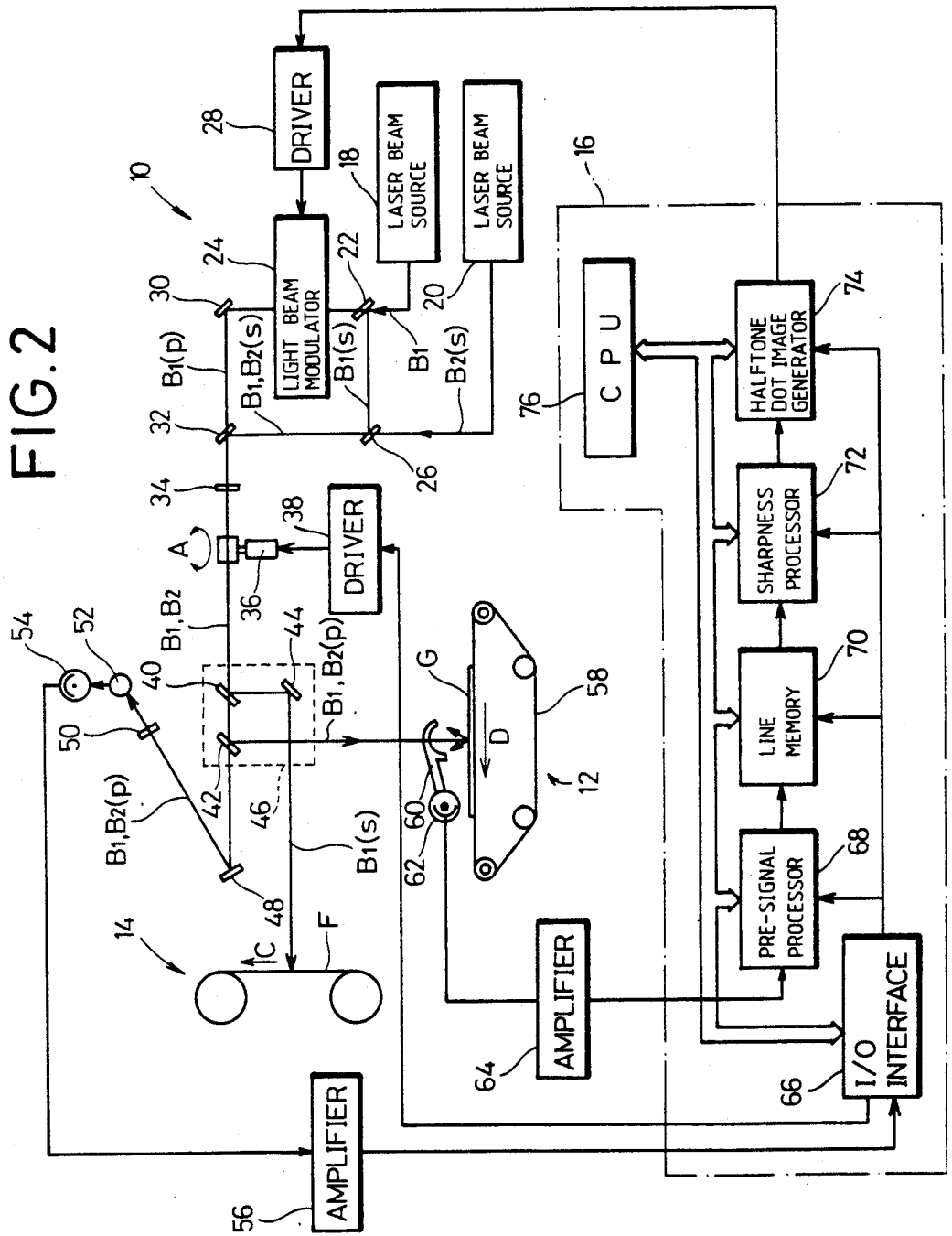
FIG. 2 is a block diagram of an image recording apparatus according to an embodiment of the present invention.

FIG. 2 shows in block form an image recording apparatus according to an embodiment of the present invention. The image recording apparatus basically comprises a laser beam optical system 10, an image reader 12, an image recorder 14, and a controller 16.

The laser beam optical system 10 has a laser beam source 18 for emitting an $Ar^+$ laser beam $B_1$ to read and record image information and another laser beam source 20 for emitting an He - Ne laser beam $B_2$ which is an S-polarized laser beam. The laser beam $B_1$ emitted from the laser beam source 18 is separated by a polarization beam splitter 22 into a P-polarized laser beam and an S-polarized laser beam which are directed respectively toward a light beam modulator 24 and a half or semireflecting mirror 26. The light beam modulator 24 comprises, for example, an acousto-optical modulator (AOM) which is driven by a driver 28 based on image signals.

The laser beam $B_1$ that has passed through the optical beam modulator 24 is reflected toward a semireflecting mirror 32 by a fully reflecting mirror 30. The laser beam $B_2$ emitted from the laser beam source 20 is passed through the semireflecting mirror 26 toward the semireflecting mirror 32. The laser beams $B_1$, $B_2$ which have passed through and have been reflected by the semireflecting mirror 32 are applied via a halfwave plate 34 to a galvanometer mirror 36. The galvanometer mirror 36 oscillates at a high speed in the directions of the arrow A by a driver 38 for deflecting the laser beams $B_1$, $B_2$ in a direction normal to the sheet of FIG. 2.

The laser beams $B_1$, $B_2$ deflected by the galvanometer mirror 36 are directed to a beam splitter assembly 46 comprising a polarization beam splitter 40, a semireflecting mirror 42, and a fully reflecting mirror 44. The polarization beam splitter 40 and the semireflecting mirror 42 guide only the P-polarized beam components of the laser beams $B_1$, $B_2$ to a fully reflecting mirror 48 and the image reader 12. The polarization beam splitter 40 and the fully reflecting mirror 44 guide only the S-polarized beam component of the laser beam $B_1$ to the image recorder 14. The image recorder 14 is loaded with a recording medium in the form of a film F which is fed in an auxiliary scanning direction indicated by the arrow C at a constant speed.

The P-polarized beam components of the laser beams $B_1$, $B_2$ are applied to a reference grating 50 having slits defined at equal intervals along the direction in which the laser beams $B_1$, $B_2$ are deflected or scanned. A cylindrical light guide bar 52 is disposed behind the reference grating 50 and extends longitudinally along the reference grating 50. A photoelectric transducer comprising a photomultiplier 54 is positioned at an end of the light guide bar 52 for converting the laser beams $B_1$, $B_2$ from the slits in the grating 50 and the light guide bar 52 to an electric signal, which is then fed to the controller 16 through an amplifier 56.

The image reader 12 has a feed means 58 for feeding an original or subject G carrying image information in the auxiliary scanning direction indicated by the arrow D. The feed means 58 is capable of changing the speed of feed of the original G according to the magnification with which image information is to be recorded or reproduced on the film F. Light reflected from the original G upon application of the laser beams $B_1$, $B_2$ from the beam splitter assembly 46 is guided by a light guide 60 comprising optical fibers or the like to a photoelectric transducer comprising a photomultiplier 62 by which the light is converted to an electric signal bearing the image information. The electric signal from the photomultiplier 62 is then supplied via an amplifier 64 to the controller 16.

The controller 16 comprises an I/O interface 66, a pre-signal processor 68, a line memory assembly 70, a sharpness processor 72, and a halftone dot image generator 74 which are controlled by a CPU 76 comprising a microprocessor or the like.

In response to a control signal from the CPU 76, the I/O interface 66 applies a drive signal to the driver 38 for operating the galvanometer mirror 36 and also supplies a grating signal coming from the reference grating 50 through the amplifier 56 to the circuits 68, 70, 72, 74 as a timing signal. The pre-signal processor 68 processes image signals supplied from the amplifier 64 for gradation conversion, shading correction, and the like. The line memory assembly 70 comprises a plurality of line memories for storing processed image signals from the pre-signal processor 68 in order to effect a sharpness enhancing process. The sharpness processor 72 effects the sharpness enhancing process on the image signals stored in the line memory assembly 70 for sharpening the edge or contour of the image. The half-tone dot image generator 74 converts the image signals processed by the sharpness processor 72 to on-off signals of a desired halftone dot size based on a halftone dot signal, and supplies the on-off signals to the driver 28.

Figure 3:
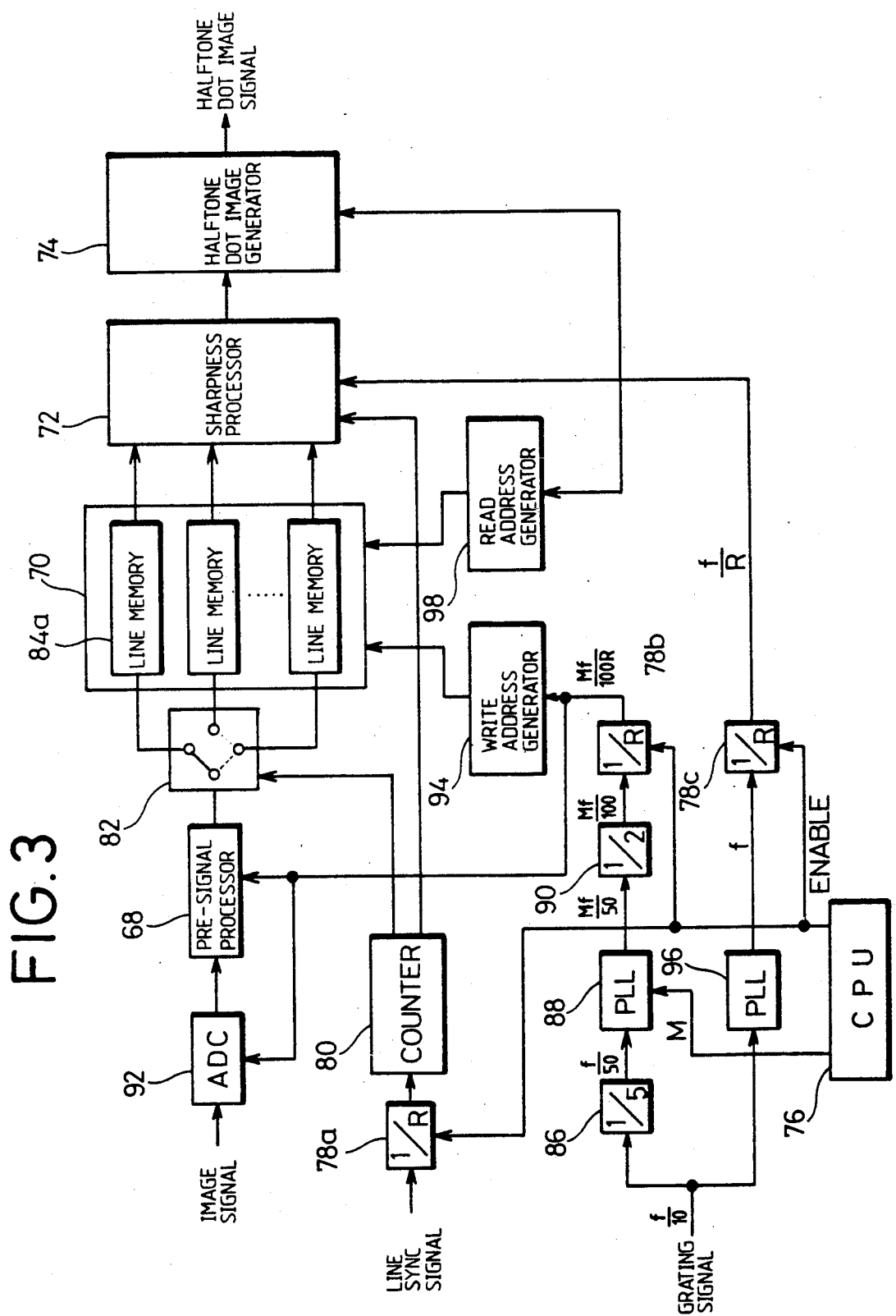
FIG. 3 is a block diagram of a portion of the image recording apparatus shown in FIG. 2.

The controller 16 which includes as central circuits the line memory assembly 70 and the sharpness processor 72 serving as an image signal processing means is illustrated in greater detail in FIG. 3. The controller 16 has three 1/R frequency dividers 78a, 78b, 78c which have a frequency-dividing ratio of 1/R and can be enabled by an enable signal from the CPU 76 which serves as a sampling signal setting means. A line synchronizing signal generated by the laser beam optical signal 10 each time the original G is scanned in the main scanning direction by the laser beams $B_1$, $B_2$ is applied to the 1/R frequency divider 78a. The line synchronizing signal which has been frequency-divided by the 1/R frequency divider 78a is then counted by a counter 80 as a switching signal setting means, and supplied as a switching signal to a switch 82 as a switching means and the sharpness processor 72. The switch 82 serves to successively switch n line memories 84a through 84n as memory means of the line memory assembly 70 in response to the switching signal from the counter 80. The line memories 84a through 84n store n sets of image information of the original G on respective main scanning lines. The controller 16 also has a 1/5 frequency divider 86 for frequency-dividing the grating signal supplied via the amplifier 56 to a signal having a 1/5 frequency. The grating signal thus frequency-divided by the 1/5 frequency divider 86 is multiplied by M by a PLL multiplier 88. The magnification M is a recording magnification (g) for the image information to be recorded on the film M, F and is supplied from the CPU 76. The signal which has been multiplied by M by the PLL multiplier 88 is frequency-divided by a ½ frequency divider 90 having a frequency-dividing ratio of ½, and then supplied to the frequency divider 78b. An output signal from the 1/R frequency divider 78b is fed to an A/D converter 92 serving as a signal converting means for converting the image signals from the amplifier 64 to digital signals and also to a write address generator 94 for the line memory assembly 70. The grating signal is further supplied to a PLL multiplier 96 by which it is multiplied by 10 and supplied to the 1/R frequency divider 78c. An output signal from the 1/R frequency divider 78c is supplied to a read address generator 98 for the line memory assembly 70, the sharpness processor 72, and the halftone dot image generator 74.

The image recording apparatus according to the present invention is basically constructed as described above. Operation and advantages of the image recording apparatus will now be described below.

The image recording apparatus shown in FIG. 2 operates to read and record image information as follows:

An $Ar^+$ laser beam $B_1$ emitted from the laser beam source 18 is divided into S- and P-polarized laser beams by the polarization beam splitter 22. Only the S-polarized laser beam is directed to the semireflecting mirror 26. The laser beam source 20 emits an He - Ne laser beam $B_2$ which is an S-polarized laser beam. The laser beam $B_2$ is combined with the S-polarized laser beam $B_1$ by the semireflecting mirror 26, and these combined laser beams $B_1$, $B_2$ are directed to the semireflecting mirror 32. The S-polarized laser beams $B_1$, $B_2$ reflected by the semireflecting mirror 32 are converted to P-polarized laser beams by the halfwave plate 34, which are then applied to the galvanometer mirror 36 that is oscillating at a high speed in the directions of the arrow A by the driver 38 based on a drive signal applied from the I/O interface 66 in response to a command from the CPU 76. Therefore, the laser beams $B_1$, $B_2$ are deflected by the galvanometer mirror 36 and directed to the beam splitter assembly 46.

The P-polarized laser beams $B_1$, $B_2$ applied to the polarization beam splitter 40 of the beam splitter assembly 46 pass through the polarization beam splitter 40 and the semireflecting mirror 42, and then are reflected by the fully reflecting mirror 48 toward the reference grating 50. As the laser beams $B_1$, $B_2$ pass through the reference grating 50, they are converted to pulsed light signals which fall on the light guide bar 52 and then are converted by the photomultiplier 54 to an electric grating signal that is supplied via the amplifier 56 to the I/O interface 66. The P-polarized laser beams $B_1$, $B_2$ reflected by the semi-reflecting mirror 42 is caused by the oscillating motion of the galvanometer mirror 36 to scan the original G in the main scanning direction (normal to the sheet of FIG. 2). At this time, the original G is being fed by the feed means 58 at a speed corresponding to a recording magnification (described later) in the auxiliary scanning direction of the arrow D. Therefore, image information carried by the original G is two-dimensionally scanned by the laser beams $B_1$, $B_2$, and reflected light bearing such image information from the original G is guided by the light guide 60 to the photomultiplier 62. The photomultiplier 62 converts the image information to electric image signals which are supplied via the amplifier 64 to the controller 16.

The image signals supplied to the controller 16 are first processed for gradation conversion, shading correction, and the like by the pre-signal processor 68 under the control of the CPU 76. Then, the processed image signals are transferred to and stored in the line memory assembly 70 for respective main scanning lines, after which the image signals are supplied to the sharpness processor 72 that effects a sharpness enhancing process on the image signals. The image signals subjected to the sharpness enhancing process are then converted to on-off signals of a desired halftone dot size based on a halftone dot signal by the halftone dot signal generator 74, and the on-off signals are then supplied to the driver 28.

The driver 28 controls the light beam modulator 24 based on the supplied on-off signals. Since the P-polarized laser beam $B_1$ that has passed through the polarization beam splitter 22 is applied to the light beam modulator 24, the P-polarized laser beam $B_1$ is converted to a pulsed laser beam corresponding to the image information by the light beam modulator 24 controlled by the driver 28. The pulsed light beam from the light beam modulator 24 is reflected by the fully reflecting mirror 30 toward the semireflecting mirror 32. The P-polarized pulsed laser beam $B_1$ that has passed through the semireflecting mirror 32 is converted to an S-polarized laser beam by the halfwave plate 34, which is then applied to the beam splitter assembly 46 by the galvanometer mirror 36. The polarization beam splitter 40 of the beam splitter assembly 46 reflects only the S-polarized laser beam $B_1$ which is guided by the fully reflecting mirror 44 toward the image recorder 14. Therefore, the laser beam B, records a two-dimensional image on the film F in the image recorder 14 by scanning the film F in the main scanning direction (normal to the sheet of FIG. 2) while the film F is being fed in the auxiliary scanning direction of the arrow C which is normal to the main scanning direction.

A method of recording an image according to the present invention will be described with reference to FIG. 3.

A sharpness emphasizing process mode in which the 1/R frequency dividers 78a through 78c are disabled by the CPU 76 and the magnification M for an image to be recorded on the film F is set to 100 % (equal size) will first be described below.

The laser beam optical system 10 generates a line synchronizing signal as a pulsed signal each time the original G is scanned along a main scanning line, and supplies the line synchronizing signal to the 1/R frequency divider 78a. The 1/R frequency divider 78a supplies the counter 80 with the line synchronizing signal as it is without frequency-dividing the same since the 1/R frequency divider 78a is disabled. The counter 80 counts the line synchronizing signals and successively controls the switch 82 based on the count to connect the pre-signal processor 68 successively to the line memories 84a through 84n.

The grating signal produced by the reference grating 50 is supplied to the 1/5 frequency divider 86 and the PLL multiplier 96. The frequency of the grating signal is set to 1/10 of a sampling frequency of f for reading one pixel, at a time, from the original G. Accordingly, the sampling pitch for scanning the original is the reciprocal of the sampling frequency, or 1/F. Therefore, the grating signal which has been frequency-divided by the 1/5 frequency divider 86 is supplied as a signal having a frequency of f/50 to the PLL multiplier 88 by which the grating signal is multiplied by the magnification $M=100$ (%) supplied from the CPU 76. The grating signal is then supplied as a signal having a frequency of 2f to the ½ frequency divider 90. The ½ frequency divider 90 further frequency-divides the grating signal to a signal having a frequency of f which is then supplied to the 1/R frequency divider 78b. Since the 1/R frequency divider 78b is disabled by the CPU 76 at this time, the A/D converter 92, the pre-signal processor 68, and the write address generator 94 are supplied with a sampling signal having a sampling frequency of f.

As a consequence, the A/D converter 92 reads the image signals produced from the original G by the laser beams $B_1$, $B_2$ at a sampling pitch Ts:

$$Ts = \frac{1}{f} = a \qquad (2)$$

and supplies the image signals to the pre-signal processor 68. In this instance, since the frequency dividers are disabled, the sampling pitch equals the sampling pitch at which the original is scanned. The pre-signal processor 68 processes the image signals for gradation conversion, shading correction, and the like, and then transfers the processed image signals via the switch 82 successively to the line memories 84a through 84n based on the sampling signal having the sampling pitch Ts.

The original G is being fed at a constant speed v in the auxiliary scanning direction indicated by the arrow D. The line memories 84a through 84n are being successively switched by the switch 82 in response to the line synchronizing signal each time the original G is scanned by the laser beams $B_1$, $B_2$. Therefore, the line memories 84a through 84n store the image signals, respectively, corresponding to the n main scanning lines.

The grating signal supplied to the PLL multiplier 96 is multiplied by 10 by the PLL multiplier 96, and supplied as a signal having a frequency of f to the 1/R frequency divider 78c. Since the 1/R frequency divider 78c is disabled at this time, a read signal having a read pitch $T_R$ indicated by:

$$T_R = \frac{1}{f} = a \qquad (3)$$

is supplied to the read address generator 98, the sharpness generator 98, and the halftone dot image generator 74. Therefore, the sharpness processor 72 successively reads the image signals stored in the line memories 84a through 84n in response to the read signal. Then, the sharpness processor 72 generates an unsharp signal from the (n × n) image signals from the line memories 84a through 84n, and effects the image signals for sharpness enhancement according to the equation (1). The processed image signals are transferred to the halftone dot image generator 74 by which they are converted to on-off signals having a desired halftone dot size based on the halftone dot signal, and the on-off signals are supplied to the driver 28.

The driver 28 drives the light beam modulator 24 based on the supplied on-off signals. At this time, the film F in the image recorder 14 is being fed in the direction of the arrow C at the same speed v as the speed of movement of the original G. Thus, the laser beam $B_1$ emitted from the laser beam source 18 and transmitted via the light beam modulator 24, the galvanometer mirror 36, and the beam splitter 46 records an image which is the same size as the original G on the film F.

when the magnification for an image to be recorded on the film F is set to M ($\neq$100 %), the CPU 76 sets the magnification M in the PLL multiplier 88. The A/D converter 92, the pre-signal processor 68, and the write address generator 94 are then supplied with a sampling signal having a sampling pitch $Ts=100a/M$ according to the equation (2).

The feed means 58 feeds the original G in the auxiliary scanning direction of the arrow D at a speed 100v/M corresponding to the magnification M. Therefore, the line memories 84a through 84n store image signals which are produced from the original G at the magnification M.

The read address generator 98, the sharpness processor 72, the halftone dot image generator 74 are supplied with a read signal having a read pitch $T_R=$ a indicated by the equation (3). The image signals are read out of the line memories 84a through 84n based on this sampling signal, and then processed for sharpness enhancement and converted to on-off signals which are then applied to the driver 28.

The film F is fed at the constant speed v in the auxiliary scanning direction of the arrow g. Consequently, an image which is M/100 times as large as the original G is recorded on the film F.

A coarse halftone dot process mode in which the speed of feed of the original G in the image reader 12 is set to v, the magnification M for an image to be recorded on the film F is set to 100 %, and the sampling pitch Ts for reading the original G is doubled will be described below. In this process mode, the 1/R frequency dividers 78a through 78c are enabled by an enable signal from the CPU 76 so that they have a frequency-dividing ratio of ½, for example.

The line synchronizing signal from the laser beam optical system 10 is frequency-divided by the 1/R frequency divider 78a into a switching signal having a ½ frequency, which is supplied to the counter 80. The counter 80 successively switches over the switch 82 with the switching signal from the counter 80.

The grating signal is frequency-divided and multiplied by the 1/5 frequency divider 86, the PLL multiplier 88, and the ½ frequency divider 90, and then frequency-divided by the 1/R frequency divider 78b into a signal having a frequency of f/2, which is supplied as a sampling signal to the A/D converter 92, the pre-signal processor 68, and the write address generator 94. The sampling signal has a sampling pitch Ts* expressed by:

$$Ts^* = \frac{2}{f} = 2a \qquad (4)$$

The sampling pitch Ts* is thus set to 2a which is twice larger than the sampling pitch Ts according to the equation (2). Further, in this instance, the sampling pitch TS* is twice larger than the sampling pitch 1/f at which the original is scanned.

Therefore, image information is read from the original G at every other pixel (unlike every pixel when the 1/R frequency dividers 78a through 78c are disabled), and image signals are stored in the line memories 84a through 84n for the respective main scanning lines. Since the line memories 84a through 84n are successively switched by the switch 82 based on the line synchronizing signal which has been frequency-divided to ½, the line memories 84a through 84n store the image signals at every other line along the main scanning direction across the auxiliary scanning direction.

After the grating signal has been multiplied by 10 by the PLL multiplier 96, the grating signal is frequency-divided to ½ by the 1/R frequency divider 78c, and supplied as a read signal to the read address generator 98, the sharpness processor 72, and the halftone dot image generator 74. The read signal has a read pitch $T_R^*$ indicated by:

$$T_R^* = \frac{2}{f} = 2a \qquad (5)$$

The read pitch $T_R^*$ is thus set go 2a which is twice larger than the read pitch $T_R$ according to the equation (3).

Accordingly, the sharpness processor 72 generates an unsharp signal based on the image signals obtained from an area twice larger in the main and auxiliary scanning directions, and then processes the image signals for sharpness enhancement according to the equation (1). Then, the processed image signals are supplied to the halftone dot image generator 74. The sharpness processor 72 effects substantially the same sharpness enhancing process as if the image signals were processed for sharpness enhancement based on (2n × 2n) pixels. Inasmuch as the halftone dot image generator 74 effects a halftone dot process on the image signals which have been processed for sharpness enhancement based on wider-range image information, appropriate on-off signals which will not lessen the desired sharpness of the image can be supplied from the halftone dot image generator 74 to the driver 28 even when the halftone dot size is increased.

The film F is being fed at the constant speed v in the auxiliary scanning direction. Since the sampling pitch Ts* for reading the image information from the original G in the main scanning direction and the read pitch $T_R^*$ are set to 2a, the same image signals are processed twice for half-tone dot formation in the main scanning direction of the film F, and the film F is exposed to the processed image signals. Inasmuch as image information is read from the original G at every other line across the auxiliary scanning line, the same image signals are processed twice also in the auxiliary scanning direction. Therefore, the same pixel information is repeated twice in the main and auxiliary scanning directions to record an image on the film F.

Because the line memories 84a through 84n are successively switched based on the line synchronizing signal which has been frequency-divided to ½, the image signals are stored twice in the line memories 84a through 84n when the original G is scanned in the main scanning direction by the laser beams $B_1$, $B_2$. For producing image signals S* in the sharpness processor 72, a first unsharp signal U is determined based on the image signals which are stored the first time in the line memories 84a through 84n, and a first image signal S* is generated using the first unsharp signal U. Then, a second unsharp signal U is determined based on the image signals which are stored the second time in the line memories 84a through 84n, and a second image signal S* is generated using the second unsharp signal U. These image signals S* are then transferred to the driver 28 via the halftone dot image generator 74. In this manner, the same image information is not produced twice in the auxiliary scanning direction of the film M, so that a better image can be produced.

A mode in which the sampling pitch Ts for reading the original G is doubled and the magnification for an image to be recorded is set to M (g) will be described below. In this mode, the speed of feed of the original G in the auxiliary scanning direction of the arrow D in the image reader 12 is set to 100/M as large as when the image magnification is 100 %g. The 1/R frequency dividers 78a through 78c are enabled with a frequency-dividing ratio being ½.

The grating signal produced from the reference grating 50 is frequency-divided to a signal having a frequency of f/50 by the 1/5 frequency divider 86, and thereafter it is multiplied by the PLL multiplier 88 and supplied as a signal having a frequency of Mf/50 to the ½ frequency divider 90. The ½ frequency divider 90 further frequency-divides the supplied signal and supplies the frequency-divided signal as a signal having a frequency of Mf/100 to the 1/R frequency divider 78b. The 1/R frequency divider 78b supplies a sampling signal having a frequency of Mf/200 go the A/D converter 92, the pre-signal processor 68, and the write signal generator 94. The sampling signal has a sampling pitch Ts** expressed by:

$$Ts^{**} = \frac{200}{Mf} = \frac{200}{M} \cdot a \qquad (6)$$

The grating signal supplied to the PLL multiplier 96 is multiplied by 10, and then frequency-divided to ½ by the 1/R frequency divider 78c. An output signal from the 1/R frequency divider 78c is then supplied as a read signal having a read pitch $T_R^{**}$:

$$T_R^{**} = \frac{2}{f} = 2a \qquad (7)$$

to the read address generator 98, the sharpness processor 72, and the halftone dot image generator 74.

Image information is read from the original G which is being fed at a speed of 100v/M, and stored in the line memories 84a through 84n at the sampling pitch Ts according to the equation (6). The sharpness processor 72 reads the image signals stored in the line memories 84a through 84n at the read pitch $T_R$ according to the equation (7) which is not dependent on the magnification M. Then, the sharpness processor 72 processes the image information multiplied by the magnification M for sharpness emphasis. The unsharp signal U is produced based on the image information from an area which is four times as large as when the 1/R frequency dividers 78a through 78c are disabled. Therefore, the halftone dot image generator 74 generates and supplies on-off signals to the driver 28 which do not lessen the sharpness of the image regardless of the varied magnification for an image to be recorded and the increased halftone dot size. Then, an image composed of coarse halftone dots is recorded with the magnification M at a constant pitch a on the film F which is being fed at the speed v in the auxiliary scanning direction.

In the above embodiment, the frequency-dividing ratio of the 1/R frequency dividers 78a through 78c is set to $\frac{1}{2}$. However, the frequency-dividing ratio may be set to a desired value 1/N (N is a positive integer) dependent on an image to be recorded.

With the present invention, as described above, image signals produced by scanning an original ar processed for sharpness enhancement, and thereafter when an image is recorded on a recording medium by scanning the same with the image signals, the image signals are read at a sampling pitch greater than a prescribed sampling pitch and then recorded at a recording pitch corresponding to the prescribed sampling pitch. Consequently, the image signals are processed for sharpness enhancement virtually in a mask size greater than a predetermined mask size. The image signals can thus be processed effectively to produce a high-quality image without having to increase the storage capacity of memories for storing the image signals.

Although a certain preferred embodiment has been shown and described, it should be understood that many changes and modifications may be made therein without departing from the scope of the appended claims.

What is claimed is:

1. A method of recording an image on a recording medium based on image signals produced from an original by scanning the original at a predetermined sampling pitch for scanning in a main scanning direction and also scanning the original in an auxiliary scanning direction transverse to said main scanning direction, said method comprising the steps of:

reading image information from said original at a sampling pitch which is N times (N is a positive integer greater than or equal to two) larger than said predetermined sampling pitch for scanning in said main scanning direction, and reading image information from said original on at least every Nth scanning line across said auxiliary scanning direction, to produce image signals;

storing said image signals in a memory means;

reading said image signals form said memory means at a read pitch which is N times larger than said predetermined sampling pitch for scanning;

processing said image signals in an image processing mode for enhancing image sharpness;

extracting the processed image signals repeatedly N times to record the processed image signals on the recording medium in a main scanning direction thereof; and extracting the processed image signals on N scanning lines including at least the processed image signals corresponding to an Nth scanning line to record the image signals on the recording medium in an auxiliary scanning direction thereof.

2. A method according to claim 1, wherein the processed image signals corresponding to said Nth scanning line are extracted repeatedly N times to record the image signals on the recording medium in the auxiliary scanning line.

3. A method according to claim 1, wherein the processed image signals corresponding to successive scanning lines are extracted successively to record the image signals on the recording medium along N scanning lines across the auxiliary scanning line.

4. An apparatus for recording an image on a recording medium based on image signals produced from an original by scanning the original at a predetermined sampling pitch for scanning in a main scanning direction and also scanning the original in an auxiliary scanning direction transverse to said main scanning direction, said apparatus comprising:

sampling signal setting means for setting a sampling signal int he main scanning direction;

signal converting means for converting image information produced by scanning the original to image signals based on said sampling signal;

a plurality of memory means for storing said image signals with respect to respective scanning lines;

switch means for successively switching said memory means with respect to the scanning lines and connecting the memory means successively to said signal converting means;

switching signal setting means for setting a switching signal to be applied to said switch means; and image signal processing means for reading said image signals from said memory means based on said sampling signal and said switching signal, said sampling signal having a sampling pitch N times (N is a positive integer greater than or equal to two) larger than said predetermined sampling pitch for scanning, said switching signal being produced by said switching signal setting means with respect to each of N scanning lines, and for processing the image signals from said memory means in an image processing mode for enhancing image sharpness.

* * * * *